US012012785B2

(12) United States Patent
Kejdana et al.

(10) Patent No.: US 12,012,785 B2
(45) Date of Patent: Jun. 18, 2024

(54) DOOR LOCK, IN PARTICULAR MOTOR VEHICLE DOOR LOCK

(71) Applicant: Kiekert AG, Heiligenhaus (DE)

(72) Inventors: Aleš Kejdana, Přelouč (CZ); Rostislav Soldat, Dolní Cerekev (CZ)

(73) Assignee: Kiekert AG, Heiligenhaus (DE)

( * ) Notice: Subject to any disclaimer, the term of this patent is extended or adjusted under 35 U.S.C. 154(b) by 297 days.

(21) Appl. No.: 17/602,904

(22) PCT Filed: Apr. 14, 2020

(86) PCT No.: PCT/DE2020/100296
§ 371 (c)(1),
(2) Date: Oct. 11, 2021

(87) PCT Pub. No.: WO2020/211905
PCT Pub. Date: Oct. 22, 2020

(65) Prior Publication Data
US 2022/0195757 A1 Jun. 23, 2022

(30) Foreign Application Priority Data
Apr. 18, 2019 (DE) ..................... 10 2019 110 253.7

(51) Int. Cl.
*E05B 77/04* (2014.01)
*E05B 81/06* (2014.01)
(Continued)

(52) U.S. Cl.
CPC .............. *E05B 77/04* (2013.01); *E05B 81/06* (2013.01); *E05B 81/14* (2013.01); *E05B 81/30* (2013.01); *E05B 85/26* (2013.01)

(58) Field of Classification Search
CPC .......... E05B 77/00; E05B 77/02; E05B 77/04; E05B 77/06; E05B 81/00; E05B 81/02;
(Continued)

(56) References Cited

U.S. PATENT DOCUMENTS

2011/0187132 A1* 8/2011 Scholz .................... E05B 81/20 292/226
2012/0032456 A1* 2/2012 Ishikawa ................ E05B 85/10 292/336.3

(Continued)

FOREIGN PATENT DOCUMENTS

CN 102165130 A 8/2011
CN 103608539 A 2/2014

(Continued)

OTHER PUBLICATIONS

Office Action dated Jan. 11, 2023 in corresponding Chinese Application No. 2020800293487.

(Continued)

*Primary Examiner* — Nathan Cumar
(74) *Attorney, Agent, or Firm* — Renner, Otto, Boisselle & Sklar, LLP

(57) ABSTRACT

A door lock, in particular a motor vehicle door lock, is designed with a locking mechanism consisting substantially of a catch and a pawl. Furthermore, a closing device which acts on the locking mechanism is provided, wherein the closing device has at least one motor-driven actuation lever, a driving pawl which interacts with a locking mechanism component, and at least one unlocking element for mechanically interrupting the force flow between the actuation lever and the drawing pawl. According to the invention, the unlocking element largely without exerting a force, for an emergency unlocking function, said coupling element being converted in the process from its formerly "engaged" state to the "disengaged" functional position.

13 Claims, 6 Drawing Sheets

(51) Int. Cl.

| | |
|---|---|
| ***E05B 81/14*** | (2014.01) |
| ***E05B 81/30*** | (2014.01) |
| ***E05B 85/26*** | (2014.01) |

(58) Field of Classification Search

CPC .......... E05B 81/04; E05B 81/06; E05B 81/12; E05B 81/14; E05B 81/15; E05B 81/24; E05B 81/26; E05B 81/30; E05B 85/00; E05B 85/20; E05B 85/24; E05B 85/26

USPC .......................................................... 70/278.7

See application file for complete search history.

(56) References Cited

U.S. PATENT DOCUMENTS

| | | | | |
|---|---|---|---|---|
| 2014/0203572 | A1* | 7/2014 | Barmscheidt | E05B 81/34<br>292/200 |
| 2016/0237722 | A1* | 8/2016 | Suholutskaja | E05B 77/06 |

FOREIGN PATENT DOCUMENTS

| | | | |
|---|---|---|---|
| CN | 105814268 | A | 7/2016 |
| CN | 208669124 | U | 3/2019 |
| DE | 19933371 | A1 | 2/2000 |
| DE | 102006059275 | A1 | 6/2008 |
| DE | 102008048773 | A1 | 3/2010 |
| DE | 202008014183 | U1 | 3/2010 |
| DE | 202008015789 | U1 | 4/2010 |
| DE | 202013102505 | U1 | 6/2013 |
| DE | 102015212411 | A1 | 1/2017 |
| DE | 202016104688 | U1 | 11/2017 |
| EP | 0979915 | A2 | 2/2000 |
| EP | 1243725 | A2 | 9/2002 |

OTHER PUBLICATIONS

International Search Report dated Jul. 15, 2020, for priority International Patent Application No. PCT/DE2020/100296.

First Office Action dated Aug. 16, 2022, for corresponding Chinese Patent Application No. 202080029348.7.

* cited by examiner

DOOR LOCK, IN PARTICULAR MOTOR VEHICLE DOOR LOCK

This application is a national phase of International Application No. PCT/DE2020/100296 filed 14 Apr. 2020, which claims priority to Germany (Federal Republic of) Application No. 10 2019 110 253.7 filed 18 Apr. 2019, the entire disclosures of which are hereby incorporated by reference.

FIELD OF DISCLOSURE

The invention relates to a door lock, in particular a motor vehicle door lock, with a locking mechanism consisting substantially of a catch and a pawl, and with a closing device which acts on the locking mechanism, wherein the closing device has at least one motor-driven actuation lever, a driving pawl which interacts with a locking mechanism component, and at least one unlocking element for mechanically interrupting the force flow between the actuation lever and the driving pawl.

BACKGROUND OF DISCLOSURE

Door locks and in particular motor vehicle door locks are nowadays often equipped with a closing device for reasons of convenience. This applies not only to motor vehicle door locks on, for example, tailgates, but increasingly also to motor vehicle door locks on side doors. With the aid of the closing device, the motor vehicle door lock in question is moved by a motor from a formerly and originally assumed pre-closed locking to a main locking position. In contrast, the pre-locking position is typically assumed manually, in which an operator closes the associated motor vehicle door or motor vehicle flap up to the pre-locking position and then the motorized closing device ensures the conversion to the main locking position. This has proven itself in principle.

When a motor vehicle door or motor vehicle flap is closed, however, situations can arise in which, for example, articles of clothing belonging to an operator or other objects or, in the worst case, even one or more fingers, become trapped. In order to manage such situations, DE 10 2006 059 275 A1, for example, describes the emergency termination of a locking process of a motor vehicle flap. For this purpose, at least one actuation lever of the flap is monitored, which can be carried out via a proximity sensor. Overall, the locking process is electrically aborted during an emergency unlocking function, wherein a reversal of movement of an associated control drive is provided in this context.

In another procedure for an emergency interruption function according to DE 20 2008 015 789 U1, the driving pawl is assigned an ejector unit for optionally interrupting the closing/opening process. In this way, the closing process is interrupted in the event of an emergency by ejecting the driving pawl with the aid of the ejector unit.

The generic state of the art according to EP 0 979 915 A2 describes a locking device for doors or the like with which, when the unlocking element is actuated, the force flow between the drive for the actuation lever and a closing aid or driving pawl is simultaneously interrupted. For this purpose, the unlocking element or an unlocking mechanism acts directly on a toggle lever. A hand lever or a tailgate handle is actuated for an emergency unlocking function. As a result, the actuation lever is pivoted. As a result, the catch is completely released and the tailgate equipped in this context with the door lock in question springs open under the pressure of the rubber seals.

The state of the art has proven itself in principle with regard to the basic possibility of emergency unlocking of the door lock or motor vehicle door lock during a closing process. However, it generally functions in such a way that for an emergency unlocking function, either the driving pawl or the actuation lever has to be acted upon in order to interrupt the mechanical force flow of the closing device. This requires not inconsiderable forces, because during the closing process both the actuation lever and the driving pawl are acted upon by the motor drive, that is to say they are in a way "pretensioned." This pretension must then be overcome for an emergency interruption or emergency unlocking function, if the actuation lever is moved or the driving pawl is ejected, as the state of the art teaches. This results in some not inconsiderable actuation forces with which the unlocking element must be acted upon. Increased actuation forces of this kind are increasingly perceived as disruptive. The invention as a whole seeks to remedy this.

SUMMARY OF DISCLOSURE

The invention is based on the technical problem of further developing a door lock and, in particular, a motor vehicle door lock of the structure described at the outset in such a way that the required actuation forces for the unlocking element are reduced compared to the state of the art.

To solve this technical problem, the invention proposes that in a generic door lock, and in particular a motor vehicle door lock, the unlocking element acts on a coupling element, which separates the closing device largely without exerting a force for an emergency unlocking function, said coupling element being converted in the process from its formerly "engaged" state to the "disengaged" functional position.

In addition to the obligatory and motor-driven actuation lever and the driving pawl acting on the locking mechanism component, the invention also uses a coupling element. During the normal closing process, the coupling element assumes its "engaged" position. The closing device as a whole is then mechanically closed and there is a continuous force flow from the motor drive via the actuation lever, the coupling element and finally to the driving pawl.

For this purpose, the driving pawl can in turn be rotatably mounted, for example, on a transmission element or transmission lever. The transmission element or transmission lever in question also receives the coupling element rotatably mounted thereon, which coupling element is usually a coupling lever. The coupling lever for its part interacts with an actuation contour on the actuation lever, at least in its "engaged" position. However, if the coupling element or coupling lever is in its "disengaged" position, the actuation lever with its actuation contour cannot act on the coupling element and consequently cannot apply force to the transmission element and the driving pawl mounted thereon.

According to the invention, the overall design is such that the unlocking element for an emergency unlocking function acts on the coupling element in question. Here, the coupling element is converted from its formerly "engaged" position to the "disengaged" functional position. At the same time, the closing device is largely separated without exerting a force. In the context of the invention, this is to be understood as meaning that the unlocking element acts exclusively on the coupling element in order to convert it from its formerly "engaged" state to the "disengaged" functional position. During this process, the actuation lever and the driving pawl and, if applicable, the transmission element retain their position, i.e. they are expressly not moved, pivoted or similarly applied with force with the aid of the unlocking element.

In this way, the mechanical connection of the individual components of the closing device can be separated largely without exerting a force, because in this case only any frictional forces between the coupling element or coupling lever and the actuation contour on the actuation lever must be overcome. There is no additional action on the actuation lever, as well as the transmission element or the driving pawl, so that the conversion of the coupling element or coupling lever from its "engaged" functional state originally assumed during the closing process to the "disengaged" functional position can take place with particularly little force compared to the state of the art.

With the exception of the coupling element or coupling lever, all other functional elements of the closing device remain in their position during this process. As soon as the closing device is mechanically interrupted when the coupling element is in its "disengaged" functional state, the locking mechanism component acted upon with the aid of the driving pawl can move away from the other locking mechanism component and the locking mechanism immediately assumes its open position. All of this is achieved in that an operator can apply particularly little force to the unlocking element, so that any inconvenience during the closing process can be managed in this way quickly, easily and with low actuation forces. Herein lie the essential advantages.

According to an advantageous embodiment, the unlocking element is designed in two parts with an emergency unlocking lever and an ejector lever. The ejector lever generally interacts with an actuation pin on the coupling lever for an emergency unlocking function. For this purpose, the ejector lever is advantageously designed in a C-shaped or U-shaped manner. In most cases, the ejector lever has a coupling arm and an actuation arm.

The actuation arm of the ejector lever generally has a contour for engaging an actuation tab on the emergency release lever. The emergency release lever itself is usually designed as a two-arm or three-arm lever. One arm of the emergency release lever acts as an actuation tab which engages in the contour on the actuation arm of the ejector lever.

The coupling arm on the ejector lever, which coupling arm is provided in addition to the actuation arm, generally has a stop edge for the actuation pin of the coupling lever. The ejector lever is in turn rotatably mounted about an axis. In addition, the ejector lever can usually be moved in an unlocking plane arranged parallel to the locking plane. The locking plane is typically spanned by the catch and the at least one pawl as part of the locking mechanism. In contrast, the unlocking plane is arranged parallel to the locking plane either above or below said locking plane. The ejector lever is also located in the unlocking plane.

In most cases, the design is such that the emergency unlocking lever, together with the ejector lever, spans the unlocking plane in question. As a result, the emergency unlocking lever and the ejector lever, as both components of the two-part unlocking element, are topologically disengaged from the locking mechanism and consequently unwanted interactions cannot occur in this context. Rather, the emergency unlocking lever acts on the ejector lever, which in turn acts with the stop edge on the coupling arm on the actuation pin of the coupling lever. The coupling lever lies together with the transmission element in a further third plane, which is mostly arranged between the locking plane on the one hand and the unlocking plane on the other hand. As a result, the individual levers can be functionally disengaged from one another in a particularly simple manner.

The driving pawl is usually arranged in the locking plane, because the driving pawl typically acts on the pawl and/or the catch for the purpose of closing it. In most cases, the design is such that the driving pawl engages a contour of the catch when it is closed and converts the catch from its formerly manually assumed pre-locking position to the main locking position. In principle, however, the driving pawl can also act on the pawl in order to convert the locking mechanism as a whole from the pre-locking position to the main locking position.

As a result, a door lock, and in particular a motor vehicle door lock, is provided that provides a particularly low-force emergency unlocking function. This can essentially be traced back to the fact that the unlocking element for an emergency unlocking function acts on the coupling element as part of the closing device, which during this process separates the closing device largely without exerting a force.

The unlocking element can typically be activated manually by an operator. For this purpose, for example, the emergency unlocking lever can be connected as part of the unlocking element to a door handle, a flap handle, etc., or it can also be implemented in addition to such a handle. As soon as the closing process is to be interrupted by an operator, this can be carried out directly by acting on the handle and thus the unlocking element.

Since the closing device is separated largely without exerting a force, the closing process can be interrupted mechanically in practically every phase without encountering any difficulties. All of this succeeds particularly quickly and effectively because only low actuation forces are required for manual actuation of the unlocking element. Herein lie the essential advantages.

BRIEF DESCRIPTION OF DRAWINGS

The invention is explained in greater detail below with reference to drawings, which show only one exemplary embodiment. In the drawings.

DETAILED DESCRIPTION

Figure 1:
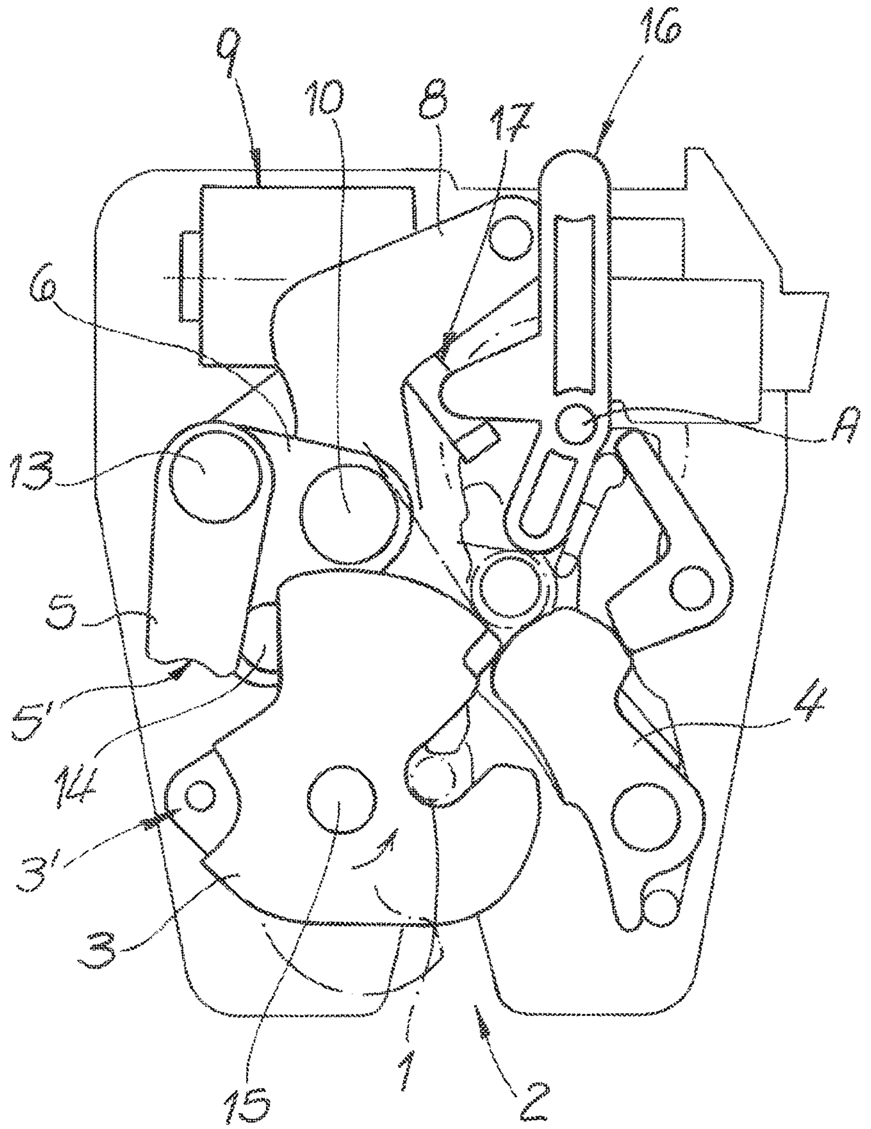
FIG. 1 is an overview of the motor vehicle door lock according to the invention.

The drawings show a door lock which, within the scope of the embodiment, is a motor vehicle door lock. The illustrated motor vehicle door lock can be designed, for example, as a tailgate lock, a side door lock or a tank flap lock, a front hood lock, etc. In FIG. 1, the motor vehicle door lock is shown in its main locking position. In order to assume this functional position, a locking bolt 1 indicated in FIG. 1 first moves into an inlet mouth 2 until a pre-locking position, indicated by dash-dotted lines in FIG. 1, of a catch 3 there is reached. The conversion of the catch 3 from the pre-locking position shown in dash-dotted lines to the main closed position shown in a solid line in FIG. 1 takes place in such a way that, according to the exemplary embodiment, a closing device 5, 6, 7, 8, 9; 16, 17 operates on the illustrated and implemented locking mechanism 3, 4 consisting of the catch 3 and a pawl 4.

Figure 2A:
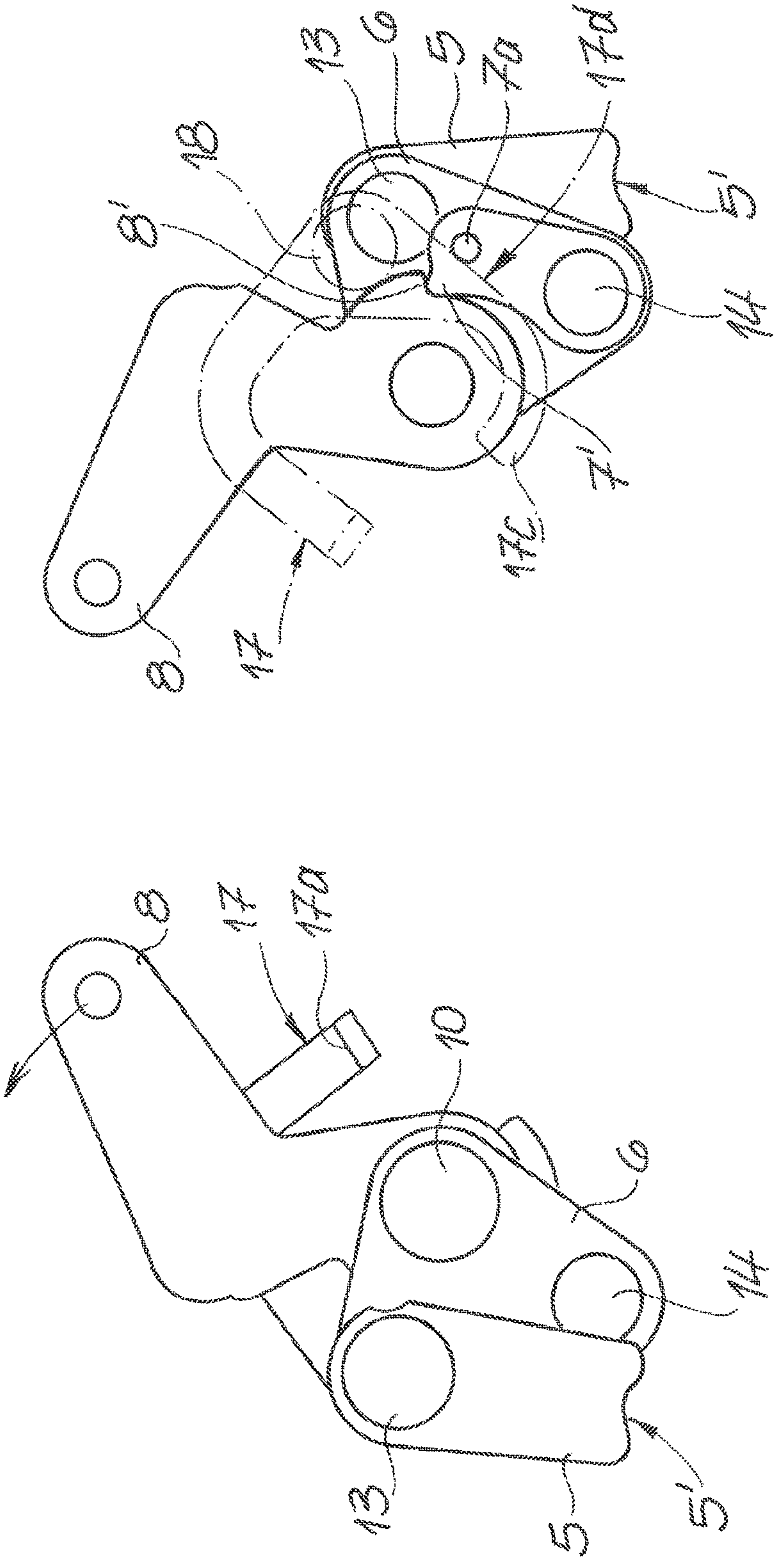
FIG. 2A-2C are front and rear views of different phases of a closing process.
Figure 2B:
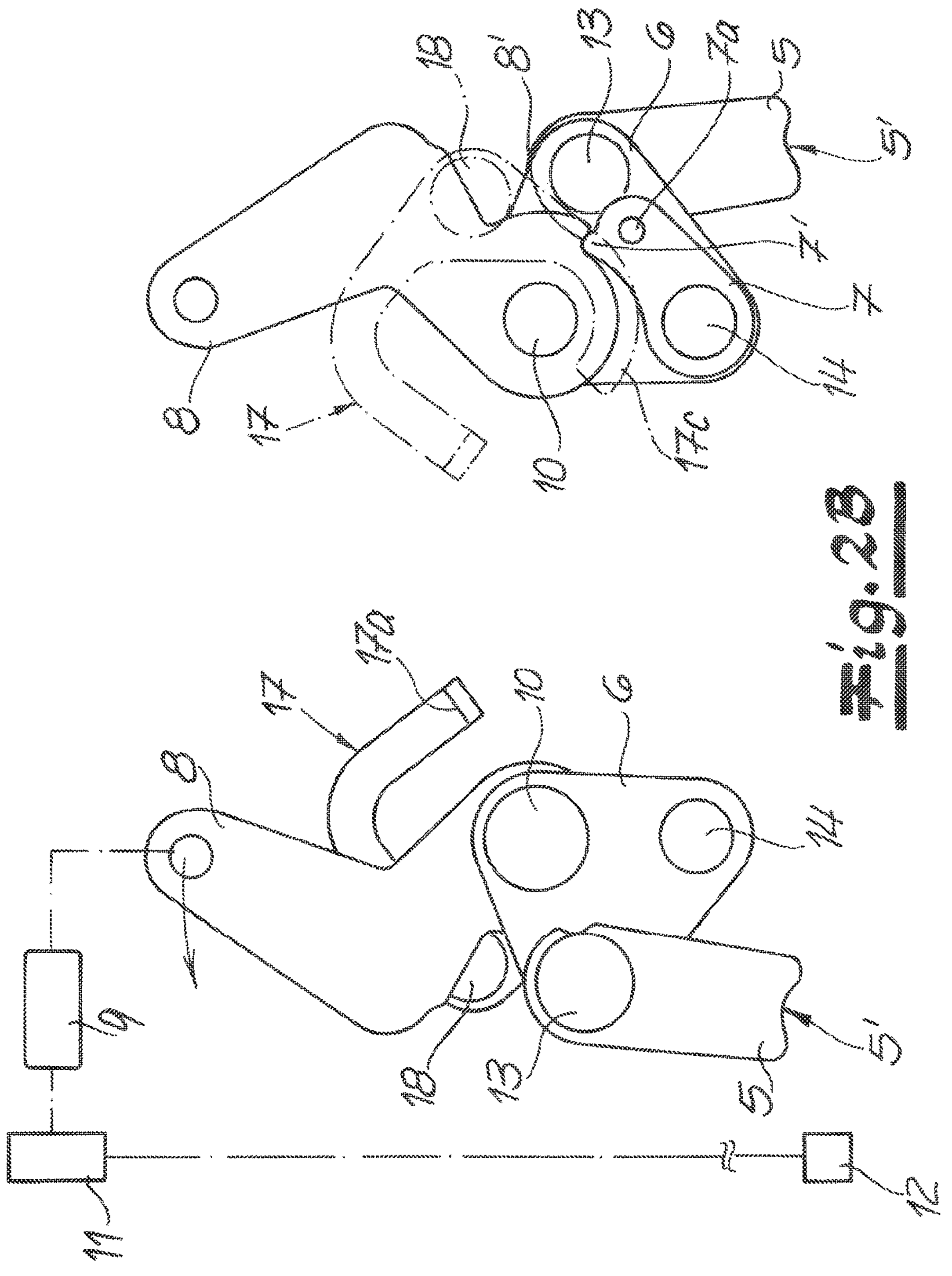
Figure 2C:
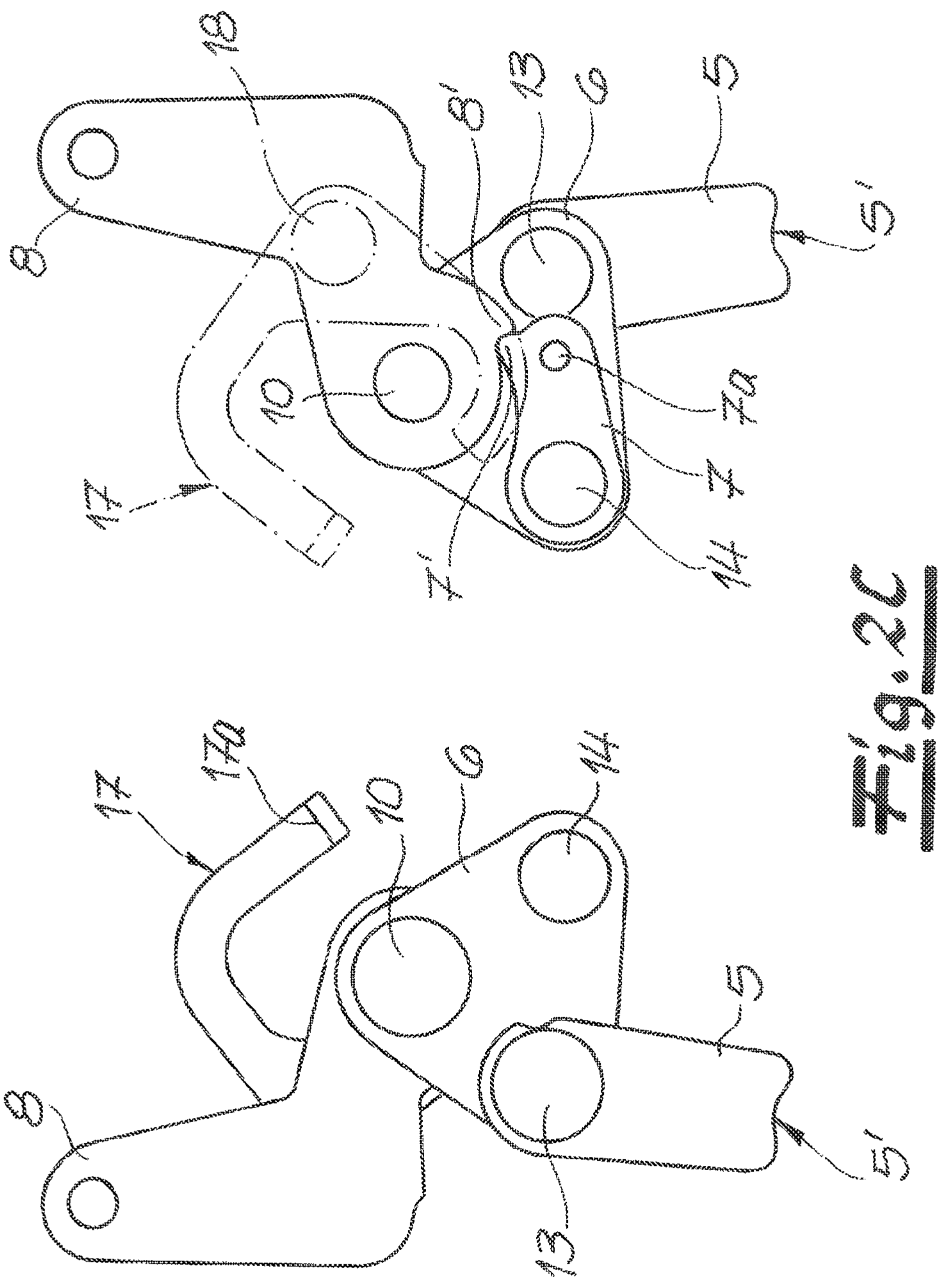

The closing device 5 to 9; 16, 17 has at least one motor-driven actuation lever 8. In the drawings, a motor drive 9 is provided for this purpose, which acts on the actuation lever 8 during the closing process in accordance with the illustration in FIG. 2A to 2C in the front view shown on the left in such a way that the actuation lever 8 executes a counterclockwise movement about its axis 10, as indicated in FIG. 2A in the front view, for example. The motor drive 9 is typically an electric motor, which is acted upon by an indicated control device 11 as soon as an additionally provided sensor 12 detects that the locking position of the locking mechanism 3, 4 has been assumed. For this purpose, the sensor 12 may check the pre-locking position of the catch 3 shown in dash-dotted lines in FIG. 1. As soon as the locking mechanism 3, 4 has reached the pre-locking position, the control unit 11 ensures, by acting on the motorized drive 9, that the actuation lever 8 in the front view and according to the representation in FIG. 2A to 2C is pivoted counterclockwise about its axis 10.

According to the exemplary embodiment, the closing device 5, 6, 7, 8, 9; 16, 17 also includes a driving pawl 5 which is rotatably mounted about an axis 13 on a transmission element or transmission lever 6. A coupling lever 7, which for this purpose is rotatably mounted about its own axis 14, is also rotatably mounted on the transmission element or transmission lever 6. The coupling lever 7 and the driving pawl 5 are arranged and supported on opposite sides of the transmission lever 6.

The coupling lever 7 is equipped with an actuation tab 7' which interacts with an actuation contour 8' on the actuation lever 8, as will be explained in more detail below.

According to the exemplary embodiment, the driving pawl 5 interacts with a locking mechanism component 3, 4, specifically with the catch 3. For this purpose, the catch 3 has an actuation contour 3', in which a further actuation contour 5' on the driving pawl 5 engages or interacts therewith in order to move the catch 3, starting from the pre-locking position shown in dash-dotted lines in FIG. 1, to the main closed locking shown in a solid line. Here, the catch 3 is pivoted about its axis 15 in the counterclockwise direction indicated in FIG. 1. At the same time, the locking bolt 1 is caught during this process and secured in the main locking position, because in the main locking position of the locking mechanism 3, 4, the pawl 4 can fall into the catch 3 as usual and serve to secure the catch 3.

In addition to the motor-driven actuation lever 8 of the closing device 5 to 9; 16, 17 and the driving pawl 5 interacting with the locking mechanism component 3, 4, the motor vehicle door lock according to the invention also has an unlocking element 16, 17 as an essential functional element as part of the closing device 5 to 9; 16, 17. With the aid of the unlocking element 16, 17, a force flow between the actuation lever 8 and the driving pawl 5 can be interrupted or, in general, the closing device 5 to 9; 16, 17 can be mechanically separated. For this purpose and for an emergency unlocking or emergency interruption function, the unlocking element 16, 17 acts on the coupling element or coupling lever 7 already described above.

According to the invention, the design is such that the unlocking element 16, 17 acts on the coupling lever 7, which separates the closing device 5 to 9; 16, 17 largely without exerting a force, for an emergency unlocking or emergency interruption function of the closing device 5 to 9; 16, 17, said coupling element being converted in the process from its formerly "engaged" state to the "disengaged" functional position. This will be explained in detail below with reference to FIG. 2A to 2C or 3A and 3B.

The unlocking element 16, 17 is in turn formed in two parts with an emergency unlocking lever 16 and an ejector lever 17. This can best be seen when comparing FIGS. 3A and 3B, which each show the motor vehicle door lock in a rear view reduced to the essential components.

The emergency unlocking lever 16 is designed as a two-arm or three-arm lever. According to the exemplary embodiment, the emergency unlocking lever 16 is equipped as a three-arm lever with an actuation tab 16*a* on the one hand and an actuation arm 16*b* on the other hand. As can be seen in particular on the basis of FIGS. 3A and 3B, the actuation arm 16*b* of the emergency unlocking lever 16 can be acted upon manually with a force F shown there. This force F is exerted by an operator on the emergency unlocking lever 16 in the event that the closing device 5 to 9; 16, 17 must be interrupted during a closing process, for example in order to immediately release a trapped article of clothing or finger. For this purpose, the emergency unlocking lever 16 can in turn be connected to a door handle or generally to a handle, which of course only applies as an example and is not absolutely necessary.

Figure 3A:
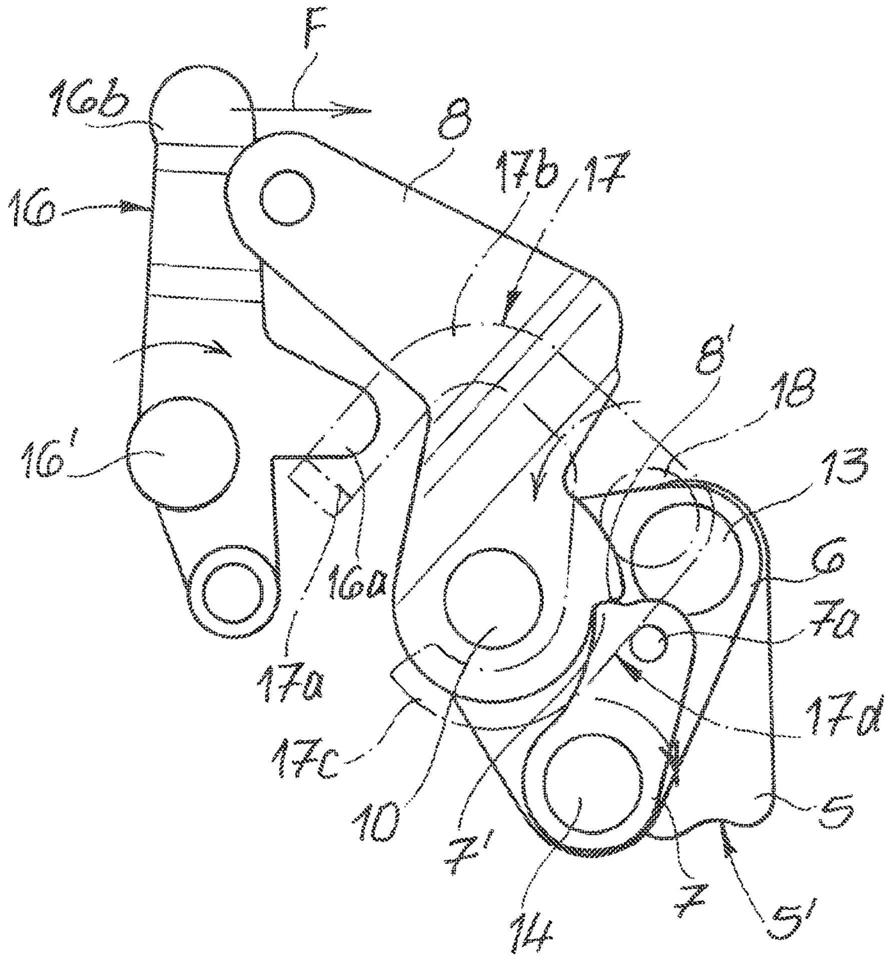
FIG. 3A shows the beginning of an emergency unlocking or emergency interruption function in the event of a closing process and FIG. 3B shows the achieved emergency unlocking or emergency interruption function.

In any case, a force F on the emergency unlocking lever 16, indicated in FIG. 3A and built up by an operator for an emergency unlocking function, results in the emergency unlocking lever 16 being pivoted about its axis 16' in the clockwise direction indicated in FIG. 3A. As a result of this, the emergency unlocking lever 16 engages with its actuation tab 16*a* in a contour 17*a* on the ejector lever 17 or interacts with the contour 17*a* in question.

The ejector lever 17 is in turn C-shaped or U-shaped. As a result, the ejector lever 17 has an actuation arm 17*b* with the aforementioned contour 17*a* on the one hand and a coupling arm 17*c* with a stop edge 17*d* on the other hand. The ejector lever 17 is for its part rotatably mounted about an axis 18. The stop edge 17*d* on the coupling arm 17*c* of the ejector lever 17 interacts with an actuation pin 7*a* on the coupling lever 7.

Overall, the topological design is such that both locking mechanism components 3, 4, i.e. the catch 3 and the pawl 4, together with their associated axes, span a locking plane in which the driving pawl 5 is also located. The emergency unlocking lever 16 and the ejector lever 17, taken together, define and span an unlocking plane, which is arranged parallel to the locking plane and, according to the exemplary embodiment, in the plan view of FIG. 3A, above said locking plane. A further third plane is provided between the unlocking plane and the locking plane, in which the transmission element or transmission lever 6 and the coupling element or coupling lever 7 are largely located. As a result, the individual aforementioned functional elements can be acted upon and moved independently of one another and without influencing one another, as will be explained in more detail below.

In FIG. 2A to 2C, a closing process is now shown in general, in each case in the left part in the front view and in the right part in a rear view. Starting in the functional position according to FIG. 2A, there is the closing drive 5 to 9; 16, 17 in its starting or initial position. As soon as the motor drive 9 has detected a pre-locking signal of the locking mechanism 3, 4 from the control unit 11 after checking the sensor 12, the drive 9 is acted upon by the control unit 11, so that in the front view at the conversion from FIG. 2A to FIG. 2B, the actuation lever 8 is pivoted about its axis 10 in the indicated counterclockwise direction. The driving pawl 5 moves downwards in the illustration and can interact with the contour 3' on the catch 3, in that the contour 5' on the driving pawl 5 comes to rest against the relevant contour 3' of the catch 3. As a result of this downward movement of the driving pawl 5, the catch 3 is pivoted about its axis 15, starting from the dot-dashed pre-locking position according to FIG. 1, counterclockwise about the axis 15, in the direction of the main locking position.

The illustrated downward movement of the driving pawl 5 is explained by the fact that the counterclockwise movement of the actuation lever 8 about its axis 10, which can be observed at the beginning of the closing process, leads to the transmission lever 6, which is rotatably connected to the actuation lever 8, also being moved in the counterclockwise direction during this process and the driving pawl 5 thereby executing the downward movement already described above.

The end of the locking process is now shown in FIG. 2C. In this entire sequence of functions, the coupling lever 7 is in its "engaged" functional position, shown enlarged in FIG. 3A. This corresponds to the fact that the tab 7' on the coupling lever 7 interacts with the actuation contour 8' on the actuation lever 8 or engages in this actuation contour 8'. As a result, a closed lever chain of the closing device 5 to 9; 16, 17 is realized and, as desired, the force can be transmitted from the drive 9 via the actuation lever 8, the coupling lever 7, and the transmission lever 6 to the driving pawl 5 and thus the catch 3 in order to close it.

If this closing process is to be ended in the event of an emergency unlocking or emergency interruption function and the force flow is to be interrupted, the invention provides that the unlocking element 16, 17 acts on the coupling lever 7, which separates the closing device 5 to 9; 16, 17 largely without exerting a force, for an emergency unlocking function. This is apparent in the transition from FIG. 3A to FIG. 3B. FIG. 3A corresponds to the beginning of such an emergency unlocking function.

For this purpose, the emergency unlocking lever 16 is acted upon by an operator with force F, so that the emergency unlocking lever 16 is pivoted about its axis 16' in the clockwise direction indicated in FIG. 3A. As a result, the actuation tab **16*a* on the emergency unlocking lever 16 engages with the contour 17*a* on the ejector lever 17. As a result, the ejector lever 17 is pivoted about its axis 18 in the indicated counterclockwise direction. As a result, the stop edge 17*d* on the ejector lever 17 moves against the actuation pin 7*a* of the coupling lever 7**.

Figure 3B:
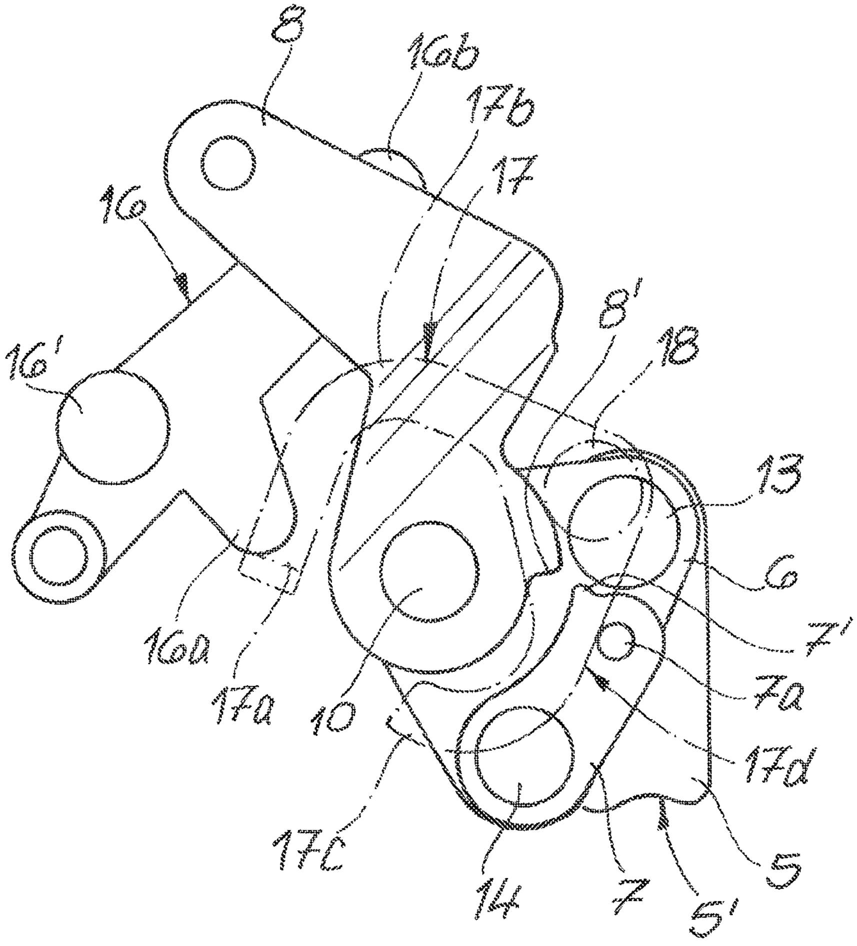

This has the consequence that in the conversion from FIG. 3A to FIG. 3B, the coupling lever 7 is pivoted clockwise about its axis 14 and as a result, the tab 7' on the coupling lever 7 is released from the actuation contour 8' of the actuation lever 8. During this process, the coupling lever 7 is converted from its formerly assumed "engaged" functional position in accordance with the representation in FIG. 3A to the "disengaged" functional state in accordance with the representation in FIG. 3B. In this case, the closing device 5 to 9; 16, 17 is separated largely without exerting a force, because both the actuation lever 8 and the transmission lever 6 as well as the driving pawl 5 maintain their position and are not acted upon during this process, or at least are acted upon only slightly, to overcome frictional forces between the actuation tab 7' and the contour 8'. As a result, the described process of interrupting the force flow of the closing device 5 to 9; 16, 17 can be carried out at any time and with a low actuation force F.

In the functional position according to FIG. 3B, the coupling lever 7 now assumes its "disengaged" position. As a result, the catch 3 can move the driving pawl 5 upwards with the aid of a spring, so that the locking bolt 1 is released immediately and the motor vehicle door or motor vehicle flap equipped with the motor vehicle door lock described can be opened. A formerly trapped article of clothing or finger can be pulled directly out of the gap between the door or flap in question and a motor vehicle body.

| List of reference signs |
| --- |
| Locking bolt 1 |
| Inlet mouth 2 |
| Catch 3 |
| Actuation contour 3' |
| Pawl 4 |
| Locking mechanism 3, 4 |
| Driving pawl 5 |
| Actuation contour 5' |
| Closing device 5, 6, 7, 8, 9 |
| Transmission lever 6 |
| Coupling lever 7 |
| Actuation tab 7' |
| Actuation lever 8 |
| Actuation contour 8' |
| Drive 9 |
| Axis 10 |
| Control unit 11 |
| Sensor 12 |
| Axis 13 |
| Axis 14 |
| Axis 15 |
| Axis 16' |
| Unlocking element 16, 17 |
| Actuation tab 16a |
| Actuation arm 16b |
| Ejector lever 17 |
| Contour 17a |
| Actuation arm 17b |
| Coupling arm 17c |
| Stop edge 17d |
| Axis 18 |
| Force F |

The invention claimed is:

1. A door lock for a motor vehicle door, the door lock comprising:

a locking mechanism including a catch and a pawl; and a closing device which acts on the locking mechanism, wherein the closing device has at least one actuation lever that is motor-driven, a driving pawl which interacts with a locking mechanism component, a transmission lever, and at least one unlocking element for mechanically interrupting a force flow between the actuation lever and the driving pawl, wherein the unlocking element acts on a coupling element, which separates the closing device without exerting a force for an emergency unlocking function during which the coupling element is converted from an engaged state to a disengaged functional position, wherein the coupling element, the actuation lever, and the driving pawl are rotatably mounted on the transmission lever, wherein in the engaged state, the actuation lever engages the coupling lever such that movement of the actuation lever drives movement of the transmission lever to drive the driving pawl to act on the catch, and wherein in the disengaged state, the coupling lever is disengaged from the actuation lever such movement of the actuation lever does not drive movement of the transmission lever.

2. The door lock according to claim 1, wherein the at least one unlocking element is formed in two parts with an emergency unlocking lever and an ejector lever.

3. The door lock according to claim 2, wherein the ejector lever interacts with an actuation pin on the coupling element for the emergency unlocking function.

4. The door lock according to claim 2, wherein the ejector lever is C-shaped with a coupling arm and an actuation arm.

5. The door lock according to claim 4, wherein the actuation arm has a contour for engaging an actuation tab on the emergency unlocking lever.

6. The door lock according to claim 4, wherein the coupling arm has a stop edge for an actuation pin of the coupling lever.

7. The door lock according to claim 2, wherein the ejector lever is rotatably mounted about an axis.

8. The door lock according to claim 2, wherein the ejector lever is configured to be moved in an unlocking plane arranged parallel to a locking plane.

9. The door lock according to claim 8, wherein the emergency unlocking lever spans the unlocking plane together with the ejector lever.

10. The door lock according to claim 2, wherein the emergency unlocking lever is formed as a two-arm or three-arm lever which is configured to be rotated about an axis.

11. The door lock according to claim 1, wherein the actuation lever and coupling element are rotatably supported on a first side of the transmission lever and the driving pawl is rotatably supported on a second side of the transmission lever, and wherein the first side is opposite the second side.

12. The door lock according to claim 1, wherein the coupling lever includes an actuation tab that interacts with an actuation contour on the actuation lever, wherein in the engaged state the actuation tab on the coupling lever engages the actuation contour on the actuation lever to connect the actuation lever and the transmission lever, and wherein in the disengaged state, the unlocking element separates the actuation tab and the actuation contour to disconnect the actuation lever and the driving pawl.

13. The door lock according to claim 1, wherein the locking mechanism and the driving pawl are located in a first plane, wherein the unlocking element is located in a second plane parallel to the first plane, and wherein the transmission lever and the coupling element are located in a third plane, wherein the third plane is arranged between the first plane and the second plane.

* * * * *